US010470109B2

(12) United States Patent
Raghavan et al.

(10) Patent No.: US 10,470,109 B2
(45) Date of Patent: Nov. 5, 2019

(54) METHODS FOR ADAPTING BEAM SCANNING FREQUENCIES IN MILLIMETER WAVE SYSTEMS

(71) Applicant: QUALCOMM Incorporated, San Diego, CA (US)

(72) Inventors: Vasanthan Raghavan, West Windsor Township, NJ (US); Junyi Li, Chester, NJ (US); Assaf Touboul, Netanya (IL)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/910,485

(22) Filed: Mar. 2, 2018

(65) Prior Publication Data
US 2018/0279213 A1    Sep. 27, 2018

Related U.S. Application Data

(60) Provisional application No. 62/476,325, filed on Mar. 24, 2017.

(51) Int. Cl.
*H04B 7/0413*    (2017.01)
*H04W 48/16*    (2009.01)
(Continued)

(52) U.S. Cl.
CPC .......... *H04W 48/16* (2013.01); *H04B 7/0408* (2013.01); *H04B 7/0413* (2013.01);
(Continued)

(58) Field of Classification Search
CPC ..... H04W 4/023; H04W 48/16; H04W 64/00; H04W 4/02; H04W 84/12; H04W 48/20;
(Continued)

(56) References Cited

U.S. PATENT DOCUMENTS

2005/0212899 A1* 9/2005 Clarke .................. B41J 2/471
347/233
2009/0209278 A1 8/2009 Narang et al.
(Continued)

FOREIGN PATENT DOCUMENTS

| EP | 3122093 A1 | 1/2017 |
| EP | 3279687 A1 | 2/2018 |
| WO | WO-2016187797 A1 | 12/2016 |

OTHER PUBLICATIONS

ASTRI, TCL Communication Ltd., "Discussion on Downlink Measurement for NR Inter-Cell Mobility," R2-1700777, 3GPP TSG-RAN WG2 Meeting #97, vol. RAN WG2, no. Athens, Greece; 20170213-20170217, Feb. 12, 2017, XP051211562, Retrieved from the Internet: URL: http://www.3gpp.org/ftp/Meetings_3GPP_SYNC/RAN2/Docs/ [retrieved on Feb. 12, 2017].
(Continued)

*Primary Examiner* — Fred A Casca
(74) *Attorney, Agent, or Firm* — Norton Rose Fulbright LLP

(57) ABSTRACT

Technology herein selectively adjusts the frequency with which beam scanning is performed. Systems and methods herein determine present conditions of the UE and determine whether adjusting the current frequency of beam scanning is desired. Based at least on the present conditions, the current frequency may be reduced, increased, or maintained in order to balance the use of processing resources with the instability of channels.

30 Claims, 8 Drawing Sheets

(51) Int. Cl.
*H04W 72/04* (2009.01)
*H04W 16/28* (2009.01)
*H04B 7/0408* (2017.01)
*H04B 7/0417* (2017.01)
*H04B 7/06* (2006.01)
*H04B 7/0452* (2017.01)
*H04B 7/10* (2017.01)

(52) U.S. Cl.
CPC ......... *H04B 7/0417* (2013.01); *H04B 7/0421* (2013.01); *H04B 7/0452* (2013.01); *H04B 7/0617* (2013.01); *H04B 7/0619* (2013.01); *H04B 7/0626* (2013.01); *H04B 7/0632* (2013.01); *H04B 7/0697* (2013.01); *H04B 7/10* (2013.01); *H04W 16/28* (2013.01); *H04W 72/0453* (2013.01)

(58) Field of Classification Search
CPC . H04W 88/06; H04W 52/0254; H04W 48/18; H04W 4/80; H04W 64/003; H04W 36/08; H04W 36/14; H04W 48/12; H04W 4/04; H04W 16/28; H04B 7/0617; H04B 7/0413; H04B 7/0417; H04B 7/0626; H04B 7/0634; H04B 7/0408; H04B 7/0452; H04B 7/0421; H04B 7/0619; H04B 7/043; H04B 7/0632; H04B 7/0695; H04B 7/0669; H04B 17/15; H04B 7/10; H04B 7/0697; H04L 2025/03414

USPC ............ 455/456.1, 432.1, 552.1, 553.1, 440, 455/414.1, 435.2, 441, 458, 525
See application file for complete search history.

(56) References Cited

U.S. PATENT DOCUMENTS

| | | |
|---|---|---|
| 2012/0124088 A1 | 5/2012 | Meshkati et al. |
| 2013/0126732 A1* | 5/2013 | Gunji ................. H01J 37/1474 250/310 |
| 2014/0192726 A1* | 7/2014 | Jain ..................... H04W 74/08 370/329 |
| 2015/0349863 A1 | 12/2015 | El Ayach et al. |
| 2015/0358129 A1 | 12/2015 | Ryu et al. |
| 2015/0358778 A1* | 12/2015 | Heo ..................... H04W 4/029 455/456.6 |
| 2016/0066252 A1 | 3/2016 | Parron et al. |
| 2017/0086134 A1 | 3/2017 | Sen et al. |
| 2018/0227771 A1 | 8/2018 | Malik et al. |
| 2018/0269954 A1 | 9/2018 | Raghavan et al. |

OTHER PUBLICATIONS

International Search Report and Written Opinion—PCT/US2018/020866—ISA/EPO—dated Jun. 1, 2018.

* cited by examiner

METHODS FOR ADAPTING BEAM SCANNING FREQUENCIES IN MILLIMETER WAVE SYSTEMS

CROSS-REFERENCE TO RELATED APPLICATIONS

This application claims the benefit of U.S. Provisional Patent Application No. 62/476,325, entitled, "METHODS FOR ADAPTING BEAM SCANNING FREQUENCIES IN MILLIMETER WAVE SYSTEMS," filed on Mar. 24, 2017, the disclosure of which is hereby incorporated by reference herein in its entirety as if fully set forth below and for all applicable purposes.

TECHNICAL FIELD

Aspects of the present disclosure relate generally to wireless communication systems, and more particularly, to selectively adjusting the frequency of performing beam scanning. Certain embodiments of the technology discussed below determine when circumstances warrant the reduction, increase, maintenance of the current frequency of beam scanning and allow systems to adjust the frequency accordingly.

INTRODUCTION

The use of wireless communication devices has diversified over time, and users expect endlessly increasing services on their User Equipment (UE). UEs are no longer restricted to phone calls and email access. Rather, users are more likely use their devices for live video calls, streaming high definition multimedia, playing real-time interactive games, and more. Wireless communication systems are tasked with uplinking and downlinking significantly more amounts of data in significantly less amounts of time in order to keep up with the new UE applications users demand.

In response, the industry moved toward Long-Term Evolution (LTE) standards to keep up with the increased demand for data. LTE enabled communication systems to increase the amount of data being transmitted through the air yet the frequency spectrum used by LTE has been unable to keep pace with user demands. Bound to a frequency spectrum that is too crowded to support the ever increasing data transmissions, LTE communications have been plagued with high latency issues and a limited amount of space for data transmissions.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method that selectively adjusts a beam scanning frequency for wireless transmission is provided. For example, a method can include performing beam scanning at an assigned frequency. Further the method may include determining a rate of change and based at least on the determined rate of change, adjusting a frequency at which the beam scanning is performed. For example, the method may include performing beam scanning at a lesser frequency as compared to an assigned frequency by skipping one or more scheduled scannings of the assigned frequency and/or performing beam scanning at a lesser frequency as compared to an assigned frequency by changing the assigned frequency to the lesser frequency. Thereafter, in embodiments, the method may include returning the performing of the beam scanning to the assigned frequency.

In embodiments, the determined rate of change is a mobility rate of change, and the method compares the determined mobility rate of change to a mobility threshold range, wherein the adjusting is based at least on the comparing. Further, the determined rate of change may be a beam variance rate of change, and the method may compare the determined beam variance rate of change to a beam variance threshold range, wherein the adjusting is based at least on the comparing. Further, in some embodiments, rather than changing the frequency at any given time based on a determined rate of change, the method may decide to maintain the assigned frequency.

In an additional aspect of the disclosure, an apparatus that selectively adjusts a beam scanning frequency for wireless transmission is provided. For example, the apparatus can include means for performing beam scanning at an assigned frequency. Further the apparatus may include means for determining a rate of change and based at least on the determined rate of change, adjusting a frequency at which the beam scanning is performed. For example, the apparatus may include means for performing beam scanning at a lesser frequency as compared to an assigned frequency by skipping one and/or more scheduled scannings of the assigned frequency or performing beam scanning at a lesser frequency as compared to an assigned frequency by changing the assigned frequency to the lesser frequency. Thereafter, in embodiments, the apparatus may include means for returning the performing of the beam scanning to the assigned frequency.

In embodiments, the determined rate of change is a mobility rate of change, and the apparatus compares the determined mobility rate of change to a mobility threshold range, wherein the adjusting is based at least on the comparing. Further, the determined rate of change may be a beam variance rate of change, and the apparatus may comprise means for comparing the determined beam variance rate of change to a beam variance threshold range, wherein the adjusting is based at least on the comparing. Further, in some embodiments, rather than changing the frequency at any given time based on a determined rate of change, the apparatus may decide to maintain the assigned frequency.

In an additional aspect of the disclosure, a non-transitory computer-readable medium having program code recorded thereon is provided. The program code can include code to selectively adjust a beam scanning frequency for wireless transmission. For example, the program code may perform beam scanning at an assigned frequency. Further the program code can determine a rate of change and based at least on the determined rate of change, adjust a frequency at which the beam scanning is performed. For example, program code can perform beam scanning at a lesser frequency as compared to an assigned frequency by skipping one or more scheduled scannings of the assigned frequency and/or perform beam scanning at a lesser frequency as compared to an assigned frequency by changing the assigned frequency to the lesser frequency. Thereafter, in embodiments, program code can return the performing of the beam scanning to the assigned frequency.

In embodiments, the determined rate of change is a mobility rate of change, and the program code compares the determined mobility rate of change to a mobility threshold range, wherein the adjusting is based at least on the comparing. Further, the determined rate of change may be a beam variance rate of change, and the apparatus may comprise means for comparing the determined beam variance rate of change to a beam variance threshold range, wherein the adjusting is based at least on the comparing. Further, in some embodiments, rather than changing the frequency at any given time based on a determined rate of change, the program code can decide to maintain the assigned frequency.

In an additional aspect of the disclosure, an apparatus that selectively adjusts a beam scanning frequency for wireless transmission is provided. The apparatus includes at least one processor, and a memory coupled to the processor. For example, the processor may perform beam scanning at an assigned frequency. Further the processor can determine a rate of change, and based at least on the determined rate of change, adjust a frequency at which the beam scanning is performed. For example, processor can perform beam scanning at a lesser frequency as compared to an assigned frequency by skipping one or more scheduled scannings of the assigned frequency and/or perform beam scanning at a lesser frequency as compared to an assigned frequency by changing the assigned frequency to the lesser frequency. Thereafter, in embodiments, processor can return the performing of the beam scanning to the assigned frequency.

In embodiments, the determined rate of change is a mobility rate of change, and the processor compares the determined mobility rate of Change to a mobility threshold range, wherein the adjusting is based at least on the comparing. Further, the determined rate of change may be a beam variance rate of change, and the processor may compare the determined beam variance rate of change to a beam variance threshold range, wherein the adjusting is based at least on the comparing. Further, in some embodiments, rather than changing the frequency at any given time based on a determined rate of change, the processor decide to maintain the assigned frequency.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
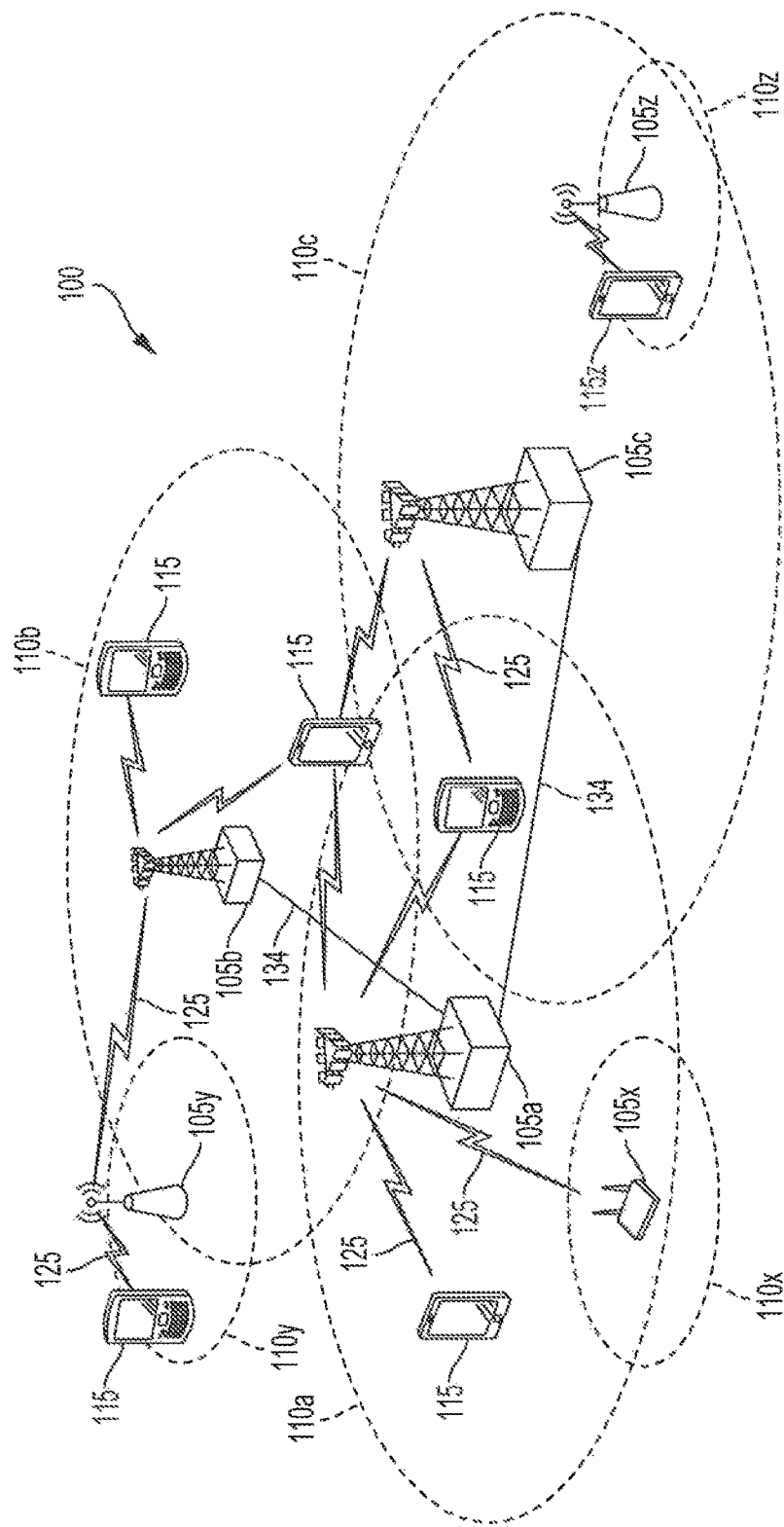
FIG. 1 is a block diagram illustrating details of a wireless communication system according to some embodiments.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

User demand for more data is continuing to grow. So, an increase in available spectrum is desired. More spectrum is available in the millimeter frequencies, which occupy the frequency spectrum of about 30 GHz to 300 GHz. The millimeter frequencies provide significantly more spectrum as compared to the microwave frequencies, which only occupy up to 30 GHz. In short, millimeter frequencies offer eight times more spectrum real estate. As such, millimeter frequencies offer the available spectrum wireless users are looking for.

Millimeter frequencies, also called the millimeter band, comprises waves of millimeter length, e.g., wavelengths in the 1 mm-10 mm range. A millimeter wave system may be abbreviated as mmW. Not only does the millimeter band lend to more spectrum real estate, but mmWs permit higher data digital rates as compared to microwaves. For example, mmWs offer upwards of 10 Gbits per second while microwaves are generally limited to about 1 Gbit per second. The millimeter band provides significantly more frequencies for use in data transmission and provides higher data rates, which lead to communications having ultra-low latencies.

That being said, mmWs experience harsher propagation conditions as compared to microwave frequencies. For example, due to the small length of the waveform, mmWs have high atmospheric attenuation and are more easily absorbed by gasses in the atmosphere. Millimeter waves' power loss is at least one of the reasons the spectrum has not been previously used for wireless communication. Such power loss leads to poor throughput and previously made the mmW spectrum practically unusable.

Beamforming precision provides a solution to the propagation issues of mmWs. In embodiments, codebooks may be used to zoom in on the most powerful mmW clusters. For example, code books may comprise a list of beam weights that take beam directionality into account. For example, each beam in the code book may have a directionality difference according to degrees (e.g., 15 degree difference between beams). A UE and its serving base station may share the code book. In embodiments, the UE and its base station may scan through the code book to determine which of the beams point to the top mmW clusters at that time. By forming a beam having the directionality that points to one of the top mmW clusters at that time, the propagation issues of mmW may be resolved.

That being said, mmW channels lack stability. As such, the mmW cluster of choice changes more frequently as compared to LTE. A mmW cluster that is strong at time $t_1$ may suffer serious propagation issues and all together be absorbed by the atmosphere in a matter of milliseconds. Thus, once a beam is selected from the code book, the beams may lose its effectiveness quickly.

Increasing the frequency of selecting a beam, for example via code book scanning, provides a solution to the channel instability experienced by mmWs. In short, systems and methods herein are able to overcome mmWs' instability by conducting beam sweeping (a.k.a., beam scanning) more frequently as compared to LTE technology. LTE performs beam scanning about every 320 ms. Embodiments herein increase the beam scanning frequency for mmWs by reducing the period of time between respective scans. For example, beam scanning may be performed as frequently as every 1 ms, 5 ms, 10 ms, 15 ms, 20 ms, and the like. The time period between respective beam scans establish the frequency with which beam scans are conducted (e.g., the beam scanning frequency).

That being said, increased beam scanning leads to hardware processing problems. Beam scanning consumes a significant amount of processing recourses, power, and time. As such, increasing beam scanning (e.g., by a factor of 64 or more) causes significant battery power consumption. Such battery consumption leads to shortened device use time and causes user dissatisfaction. Further, the increased processing causes an increase in ambient hardware temperatures. Ambient hardware temperature increases lead to hardware failure and cause further user dissatisfaction.

Embodiments herein provide solutions to these processing problems by selectively adjusting the frequency of the beam scanning when appropriate. For example, systems and methods herein may determine an ideal beam scanning frequency and adjust a processor's beam scanning frequency to match that. For instance, systems and methods may determine a beam's rate of change and adjust the scanning frequency based at least on that rate of change. In embodiments, an estimated rate of change may be determined, and the scanning frequency may be increased or decreased based on the estimated rate of change.

Determining the rate of change may be performed in various ways. For example, systems and methods may determine a rate of change based on a UE's location with reference to its serving base station and/or cluster. Additionally or alternatively, the rate of change may be based on a number of beam changes made over a number of beam sweeps. Additionally or alternatively, a rate of change may be based on an orientation of a UE (e.g., landscape orientation vs. portrait orientation, north facing vs. east facing, and the like). Various ways of determining a rate of change are disclosed herein.

Scanning frequency adjustments may be performed in a variety of ways. For example, selectable scanning frequencies may include periods of 1 ms, 5 ms, 10 ms, 15 ms, 20 ms, and/or the like. In such examples, systems and methods may select a period that matches an ideal scanning frequency at that time. Additionally or alternatively, adjusting scanning frequencies may involve skipping scheduled scans. For example, systems and methods may choose to skip one or more scheduled beam scan and/or perform beam scanning once for every n number of scheduled scans. For example, if a scanning period is set at 10 ms, a processor may skip nine of every ten scans thereby effectively operating under a scanning period of 100 ms. Various ways of adjusting the scanning frequency are disclosed herein.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5G networks, Internet of Everything networks, Internet of Things networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATS) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. Various types of networks may be used to deploy embodiments and premises of the technology discussed herein.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNBs.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE REs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

FIG. 1 shows a wireless network 100 for communication, which may be an LTE-A network (other types of networks may also be utilized). The wireless network 100 includes a number of evolved node Bs (eNBs) 105, gNBs, and other network entities. An eNB and/or gNB may be a station that communicates with the UEs and may also be referred to as a base station, a node B, an access point, and the like. Each eNB 105 and/or gNB 105 may provide communication coverage for a particular geographic area. The term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time.

Synchronous networks may organize cells into zones, wherein a zone comprises a plurality of cells. The zones of a wireless network may allocate zone specific resources such that a UE may move freely throughout a zone using the same zone specific resources as it travels from one cell to another. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, watch, or the like. Regarding the Internet of Things (IoT), a UE may be referred to as a IoT UE which may be an appliance, thermostat, water meter, electric meter, gas meter, sprinkler system, refrigerator, hot water heater, oven, car, navigation system, pace maker, implanted medical device, location tracker, bicycle computer, entertainment device, television, monitor, vehicular component, vending machine, medical device, and the like. A UE may be able to communicate with macro eNBs, pico eNBs, femto eNBs, relays, and the like. In FIG. 1, a lightning bolt (e.g., communication links 125) indicates desired transmissions between a UE and a serving eNB, which is an eNB designated to serve the UE on the downlink and/or uplink, or desired transmission between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 subs bands for a corresponding system bandwidth of 1.4, 3, 5, 10, 15, or 20 MHz, respectively. The devices illustrated in FIG. 1 are operable to carry out the techniques and operations disclosed herein.

As explained above, the growing demand for mobile broadband access has created an increase in communications between an eNB and a UE. Traditionally, all of the mobile originated (MO) data transmission steps are performed before each MO transmission, and every mobile terminated (MT) transmission step is performed before every MT transmission. Typically, all of the setup steps are repeated a multitude of times throughout an hour tying up a considerable about of network bandwidth and UE battery life. Further, because these steps are repeated for each transmission, the setup steps increase data latency. As such, it would be desirable to have systems and methods that allow for the reduction of the aforementioned steps and communications prior to MO and/or MT communications. That being said, there may be times when performing most or all of the previous steps may be appropriate due to the type of data being sent, the mobility of the UE, and/or the status of the UE. Thus, it would be further desirable to have systems and methods operable to determine which steps and communications are appropriate given the circumstances and configure the UE to perform a reduced set of steps and communications when appropriate and perform a robust set of steps and communications when appropriate.

Figure 2A:
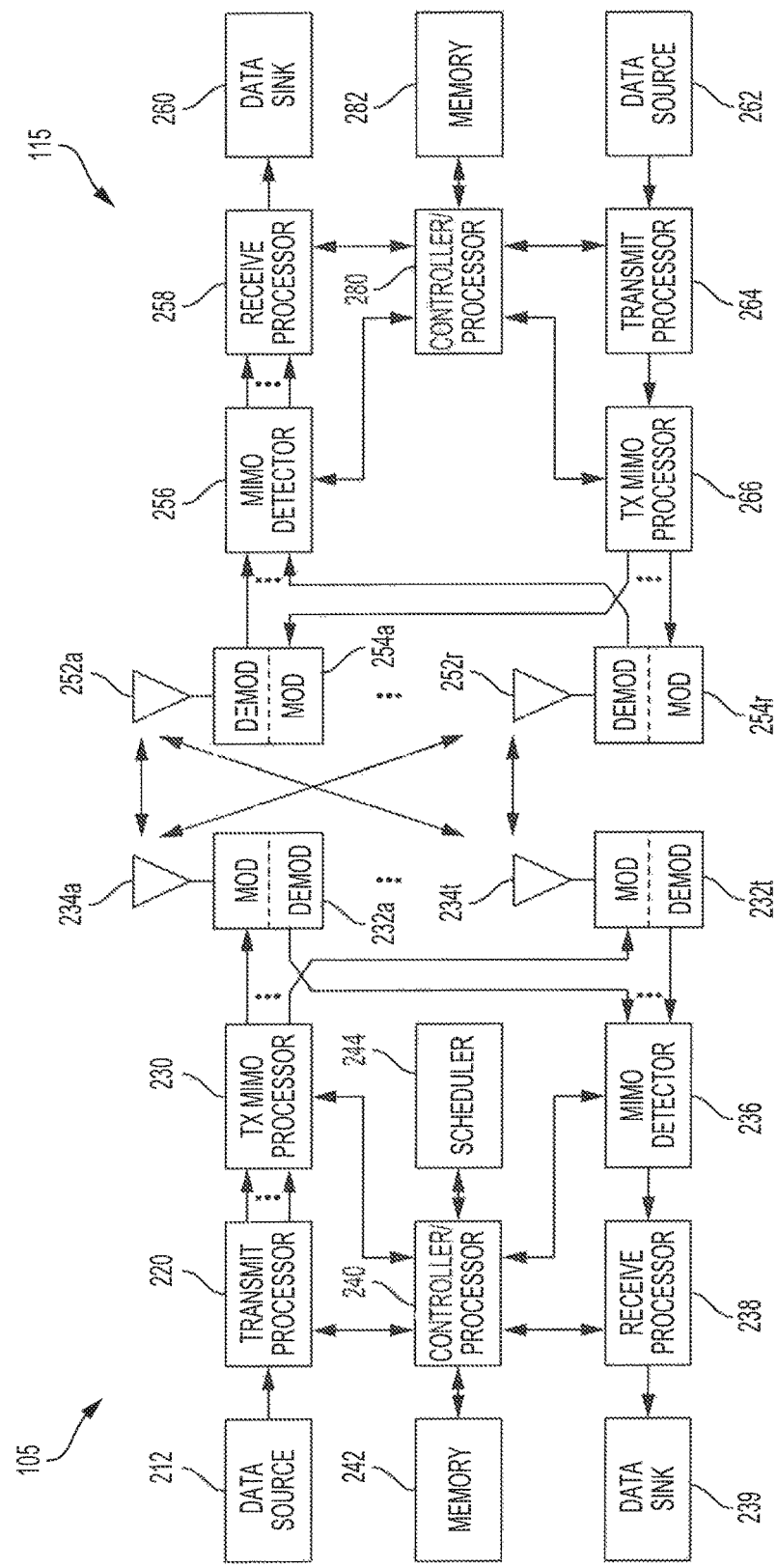
FIG. 2a is a block diagram conceptually illustrating a design of a base station/eNB/gNB and a UE configured according to some embodiments.

FIG. 2 shows a block diagram of a design of a base station/gNB/eNB 105 and a UE 115, which may be one of the base stations/eNBs and one of the UEs in FIG. 1. For a restricted association scenario, the eNB 105 may be the small cell eNB 105z in FIG. 1, and the UE 115 may be the UE 115z, which in order to access small cell eNB 105z, would be included in a list of accessible UEs for small cell eNB 105z. The eNB 105 may also be a base station of some other type. The eNB 105 may be equipped with antennas 234a through 234t, and the UE 115 may be equipped with antennas 252a through 252r.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the eNB 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 3-5, and/or other processes for the techniques described herein. The memories 242 and 282 may store data and program codes for the eNB 105 and the UE 115, respectively. A scheduler 244 may schedule UEs for data transmission on the downlink and/or uplink.

Figure 2B:
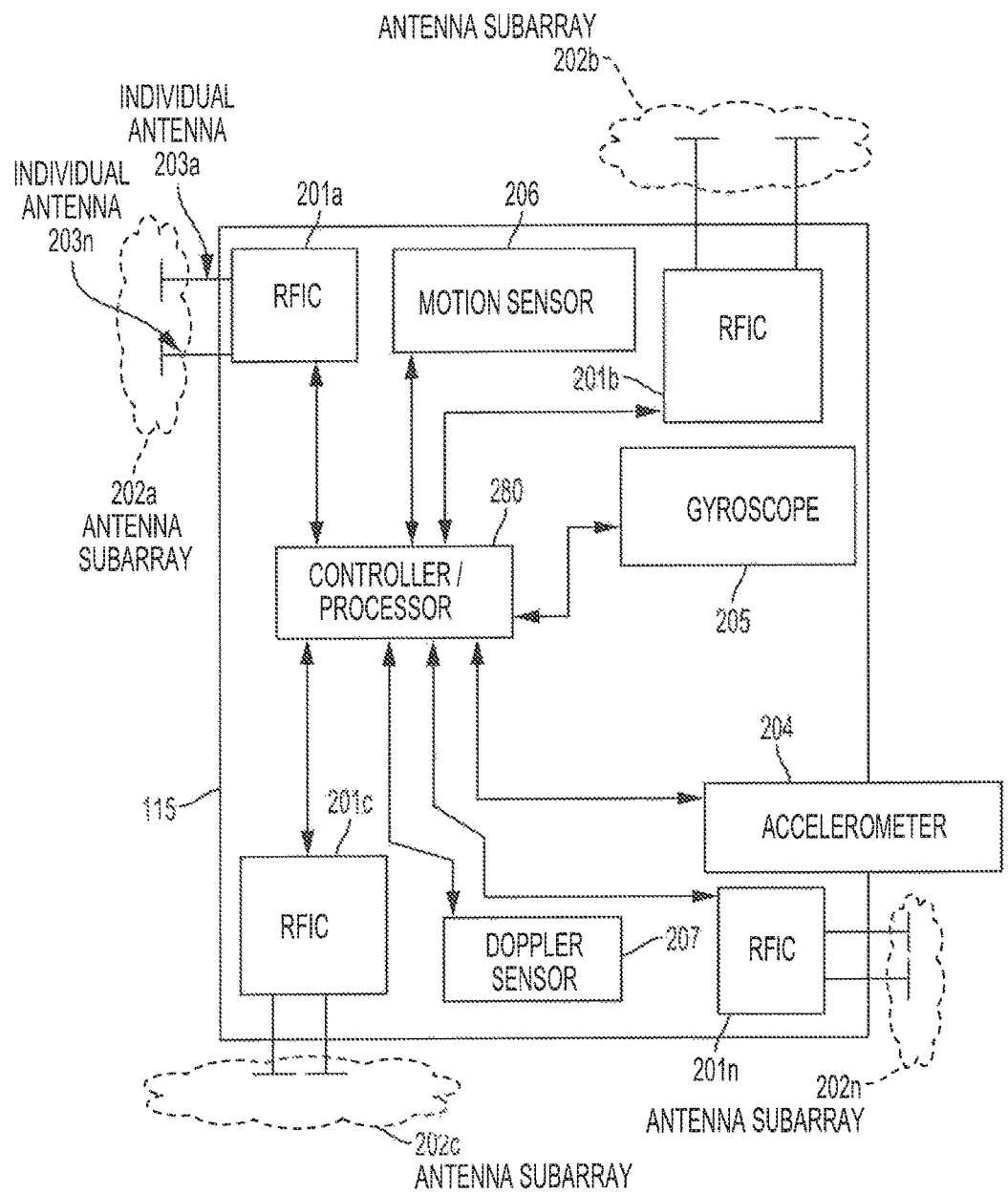
FIG. 2b is a block diagram conceptually illustrating a UE configured according to some embodiments.

FIG. 2b is a block diagram conceptually illustrating a UE configured according to some embodiments. UE 115 comprises one or more antenna subarrays 202a-202n. An antenna subarray 202a may include multiple individual antennas 203a-203n. An antenna subarray 202a may be controlled by an RFIC 201a. UE 115 may include a plurality of radio frequency integrated circuits (RFICs), each of which control a respective antenna subarray. For example, RFID 201a may control antenna subarray 202a; RFID 201b may control antenna subarray 202b, RFID 201c may control antenna subarray 202c; and RFID 201n may control antenna subarray 202n.

One or more of RFIC 201a-201n may be configured to support dual connectivity, wherein the RFIC can send and receive information according to more than one connectivity scheme. For example, RFIC 201a may switch modes in order to support communications according to 3G schemes (e.g., microwaves), LTE schemes (e.g., microwaves), and/or 5G schemes (e.g, mmW) as is desired at any given time. One or more of RFIC 201a-201n may operate to form beams in differing directions. The ability to form beams in differing directions increases the chances that a beam may be formed in a direction that supports quality communications.

Base station 105 and UE 115 may share one or more common code book. The code book may be stored in a memory of UE 115 (e.g., memory 282). The code book may comprise beam codes which differ at least in directionality. During beam scanning, a processor (e.g., controller/processor 280) may process through the beam codes in the code book. Based at least on one or more reference signal received power (RSRP) metric, reference signal received quality (RSRQ) metric, and/or reference signal strength indicator (RSSI) metric, the processor may determine current characteristics of the various beams at that time. Having determined the current conditions of the various beams at that time, the processor may determine which of the beams show the highest likelihood of successful communication as compared to the other beams.

Because base station 105 and UE 115 share a common codebook, processors of base station 105 and processors of UE 115 may each perform beam scanning. Controller/processor 280 of UE 115 may perform independent beam scanning for each respective RFIC. For example, controller/processor 280 may perform beam scanning specifically for RFIC 201a; controller/processor 280 may perform beam scanning specifically for RFIC 201b; controller/processor 280 may perform beam scanning specifically for RFIC 201c; and controller/processor 280 may perform beam scanning specifically for RFIC 201n. Further, beam scanning may be supported in multiple connectivities. For example, beam scanning may be performed while connected via LTE. Further, beam scanning may be performed while connected via 5G.

UE 115 may also comprise one or more sensors. Example sensors include but are not limited to a motion sensor 206, a gyroscope 205, an accelerometer 204, and a Doppler sensor 207. UE 115 may locate any of the various sensors throughout the UE and may include one or more of the various sensors (e.g., multiple motion sensors, multiple gyros, etc.). Some or all of the components shown in FIG. 2b may be used to perform the methods described below.

Figure 3:
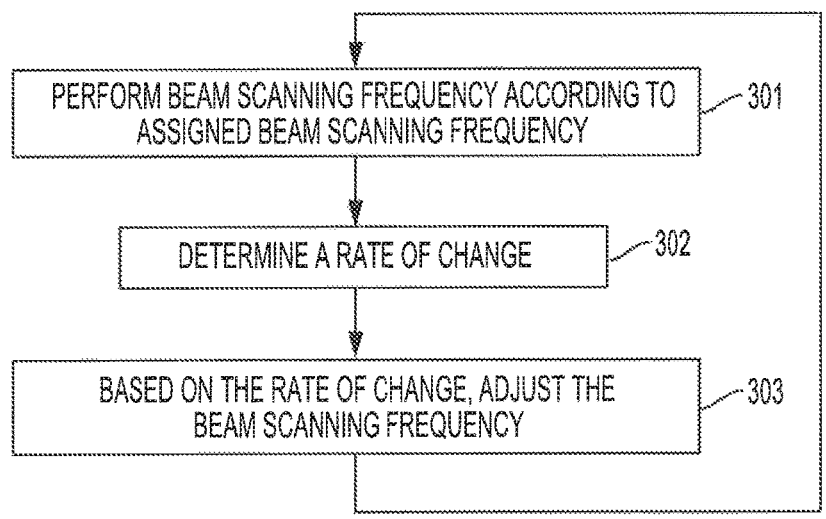
FIG. 3 is an example method of adjusting a beam scanning frequency according to some embodiments.

FIG. 3 illustrates example method 300 of adjusting beam scanning based at least on a rate of change using systems disclosed herein. In embodiments, UE 115 is assigned a beam scanning frequency. For example, the assigned frequency may be statically stored in the UE. In another example, base station 105 sends UE 115 a beam scanning frequency assignment. In this example, a base station may send a beam scanning assignment upon the base station becoming the UE's serving base station (e.g., when UE 115 powers up, when UE is passed to base station 105, and the like). In embodiments, base station 105 may assign one or more UE to a beam scanning frequency of 5 ms, 10 ms, 20 ms, or the like. In the example of a 5 ms scanning frequency, UE 115 performs the assigned beam scanning by beam scanning every period of 5 ms. The originally assigned beam scanning frequency assignment may be standardized (e.g., 10 ms). The originally assigned beam scanning frequency may be based on transmission conditions (e.g. atmospheric conditions, data traffic, etc.) as determined by the base station or UE. And/or, the original assignment may be based on a combination of the standardization and transmission conditions. In this example, at step 301, UE 115 performs beam scanning according to the assigned beam scanning frequency.

In step 302, a processor determines a rate of change. In embodiments, controller processor 280 of UE 115 determines the rate of change. Additionally or alternatively, controller processor 240 of base station 105 may determine the rate of change. Then, in step 303, based on the determined rate of change or combined determined rate of changes, controller processor 280 of UE 115 and/or controller processor 240 of base station 105 adjusts the beam scanning frequency, UE 115 and/or base station 105 may adjust the beam scanning frequency by increasing the frequency, decreasing the frequency, or maintaining the frequency as it is.

Base station 105 may increase or decrease beam scanning frequency by assigning a different beam scanning frequency. For example, base station 105 may change the beam scanning frequency assignment from 10 ms to 5 ms. In another example, base station 105 may change the beam scanning frequency assignment from 10 ms to 20 ms. Further, base station 105 may instruct UE 115 to skip n scans for every N assigned scans, wherein n is a subset of N.

UE 115 may increase or decrease its beam scanning frequency by adjusting the periods between which it performs a beam scan. For example, UE 115 may decrease the period of time between performing beam scanning from 10 ms to 5 ms. In another example, UE 115 may increase the period of time between scanning from 10 ms to 20 ms. Further, UE 115 may decrease its beam scanning frequency by skipping one or more of the assigned scans (e.g., the base station assigned scan). For example, if the base station assigned a scanning frequency of 10 ms, UE 115 may decide to skip three of four successively assigned frequency scans (e.g., ratio of ¾). In effect, UE 115 would be beam scanning every period of 40 ms even though the base station assigned beam scanning frequency at 10 ms. In another example, a UE 115 that is skipping beam scans (e.g., according to a ratio, such as ¾) can increase its beam scanning frequency by reducing the skipping rate (e.g., reduce the skipping ratio, such as to ½).

Changes to the beam scan frequency may be made in a single change step. Alternatively, changes to the beam scan frequency may be incremental, for example, a constant rate of change or a ramp-up/ramp-down (e.g., each change increases/decreases, by a factor or exponentially). For example, UE 115 may change its current beam scan frequency to the assigned beam scan frequency in a single step (e.g., switch from 5 ms to 10 ms periods). In an example of incremental change, if UE 115 is currently skipping three of four (3/4) assigned beam scans, UE 115 can increase the current beam scan frequency by skipping two of four (2/4) assigned beam scans for a period of time, then skipping one of four (1/4) assigned beam scans for a period of time, then skipping zero of four (0/4) assigned frequency scans. Such a progressive method may be used to test various beam scan frequencies, allowing for a beam scan frequency determination to be made based on the tests.

Figure 4A:
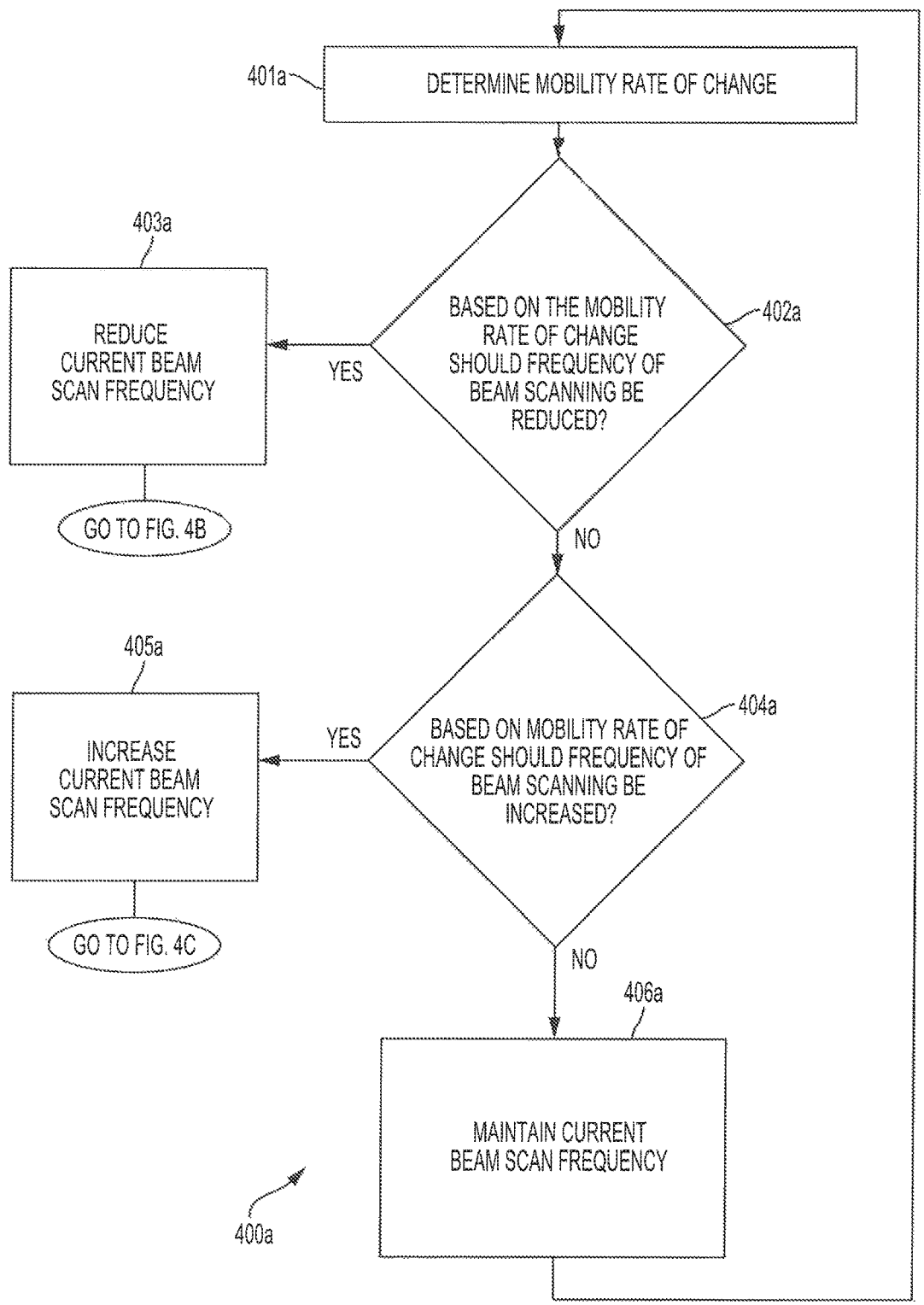
FIG. 4a is an example method of adjusting a beam scanning frequency according to some embodiments.

FIG. 4a illustrates an example method 400a wherein the rate of change is based on mobility (e.g., a UE's mobility). In step 401a, a processor determines a mobility rate of change. In embodiments, controller processor 280 of UE 115 determines and/or estimates its relative motion from serving base station 105 using a motion sensor 206, gyro 205, accelerometer 204, and/or any combination thereof. Additionally or alternatively, a Doppler sensor or detector 207 of UE 115 determines and/or estimates its relative motion from dominant clusters in the present channel using a Doppler estimation algorithm. Next, based on the determined rate of change, adjustment to the current beam scanning frequency is desired. In step 402a, based on the determined mobility rate of change, controller processor 280 of UE 115 decides whether reducing the current beam scanning frequency is desired. For example, if controller processor 280 of UE 115 determines that the mobility rate of change is above a mobility threshold range, then method 400a moves to step 403a, wherein the controller processor 280 reduces the current beam scanning frequency. Examples of beam scanning frequency reductions are described above. Thereafter, the method moves to FIG. 4b, which is explained in more detail below.

If in step 402a, controller processor 280 of UE 115 decides the current beam scanning frequency should not be reduced, method 400a moves to step 404a. In step 404a, based on the determined mobility rate of change, controller processor 280 of UE 115 decides whether the current beam scanning frequency should be increased. For example, if controller processor 280 of UE 115 determines that the mobility rate of change is below a mobility threshold range, then method 400a moves to step 405a, wherein the controller processor 280 increases the current beam scanning frequency. Examples of beam scanning frequency increases are described above. If in step 404a controller processor 280 of UE 115 determines that the mobility rate of change is within a mobility threshold range, then method 400a moves to step 406a, wherein the current beam scanning frequency is maintained (e.g., not increased or decreased). Thereafter, method 400a may be repeated as desired (e.g., periodically, upon a detected change in condition, and/or the like).

Figure 4B:
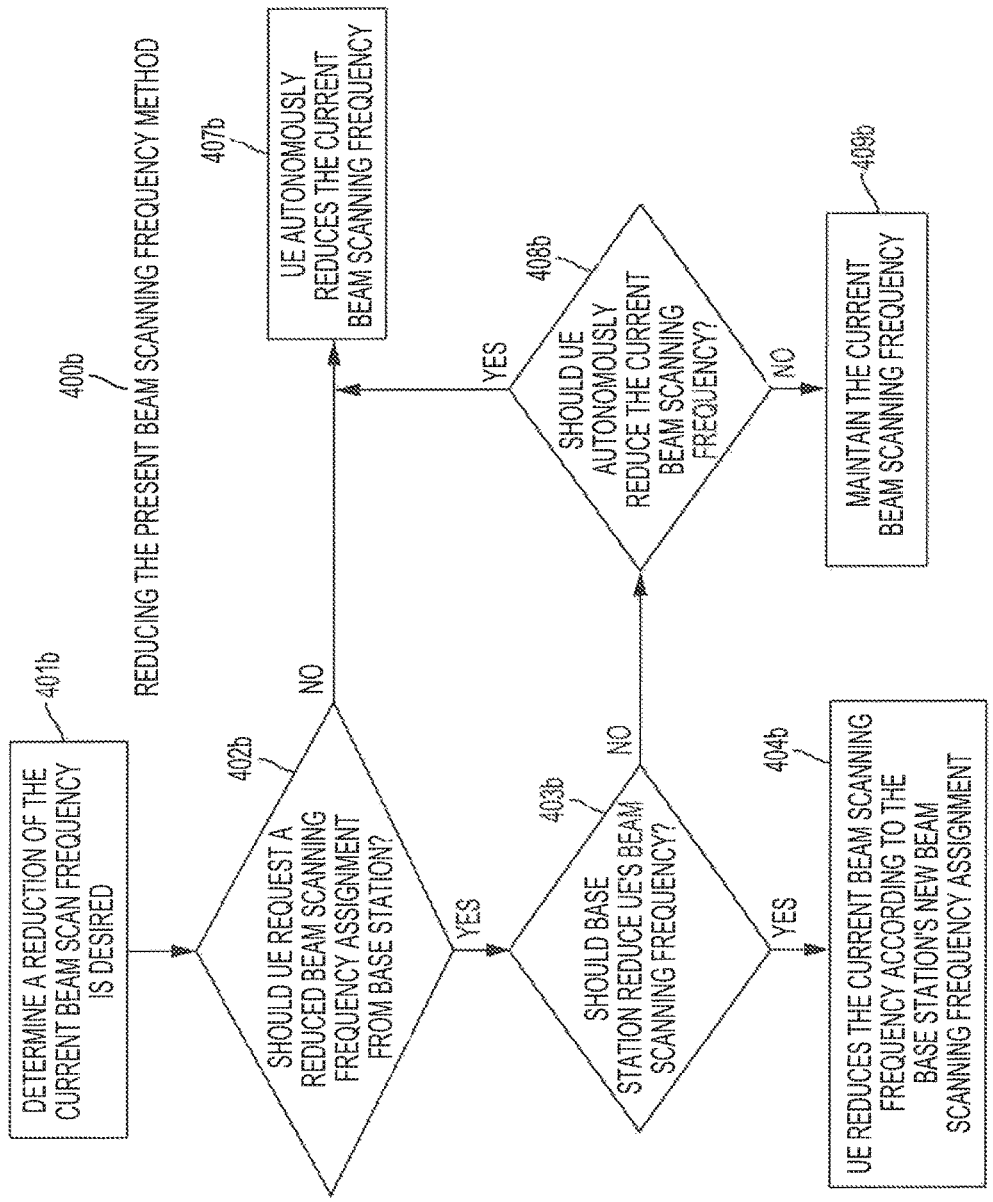
FIG. 4b is an example method of adjusting a beam scanning frequency according to some embodiments.

FIG. 4b illustrates an example method 400b, which reduces beam scanning frequency. Reducing beam scanning frequency (e.g., increasing the periods between beam scans) may be called low mobility mode. In embodiments, there may be a plurality of tiers of low mobility mode, wherein the lower the mobility rate of change, the lower the low mobility mode tier. At step 401b, similar to step 403a, a controller processor 280 determines that scan frequency reduction is desired. In step 402b, controller processor 280 of UE 115 determines whether to request a reduced scanning frequency assignment from base station 105. UE 115 may make this determination based on all the sensor data it has collected over the past few time periods. If UE 115 decides to request a reduced beam scanning frequency from base station 105, then transmit processor 264 of UE 115 may send a scanning frequency assignment reduction request to receive processor 238 of base station 105. After receiving the request, in step 403b, control processor 240 of base station 105 determines whether to reduce the current beam scanning frequency of UE 115. Base station 105 may make this determination based on all the requests of all the UEs that are serviced within the cell by that base station. If controller processor 240 of base station 105 decides to reduce the current beam scanning frequency assignment of UE 115, transmit processor 230 of base station 105 transmits a new beam scanning frequency assignment to receive processor 258 of UE 115. The transmitted new beam scanning frequency assignment is reduced as compared to the current scanning frequency assignment. After receiving the new beam scanning frequency assignment, UE 115 adjusts its scanning frequency accordingly in step 404b. As is explained above, UE 115 may switch to the new beam scanning frequency assignment or reach the new beam scanning frequency assignment incrementally. Thereafter, future beam scans are performed according to the new scanning frequency assignment.

If at step 402b, UE 115 decides to reduce its current beam scanning frequency without requesting a new scanning frequency assignment from base station 105, then UE moves to step 407b. UE 115 may make this determination based on whether it stands to benefit by informing the base station of its need to reduce its beam scanning frequency. In step 407b, UE 115 autonomously reduces its current beam scanning frequency. As is explained above, UE 115 may switch to the new beam scanning frequency or reach the new beam scanning frequency incrementally. UE 115 may or may not inform base station 105 of the frequency reduction. Thereafter, method 400a may be repeated as desired (e.g., periodically, upon a detected change in condition, and/or the like).

If at step 403b, base station 105 decides to deny the scanning frequency assignment reduction request of UE 115, then at step 408b, UE 115 determines whether to adjust the beam scanning frequency autonomously. UE 115 may make this determination based on whether such an autonomous scanning frequency change does not violate any of the beam assignments made by the base station (such as those on CQI, PMI and RI). If UE 115 acquiesces to base station's 105 denial, then UE's beam scanning frequency is maintained (e.g., remains the same), step 409b. UE 115 may make this determination based on the possible violation of any base station assignment upon a scanning frequency change. Thereafter, method 400a may be repeated as desired (e.g., periodically, upon a detected change in condition, and/or the like).

If UE 115 decides to reduce its beam scanning frequency despite base station's 105 denial, then method 400b moves to step 407b. In step 407b, UE 115 autonomously reduces the current beam scanning frequency. As is explained above, UE 115 may switch to the new beam scanning frequency or reach the new beam scanning frequency incrementally. UE 115 may or may not inform base station 105 of the reduction. Thereafter, method 400a may be repeated as desired (e.g., periodically, upon a detected change in condition, and/or the like).

Figure 4C:
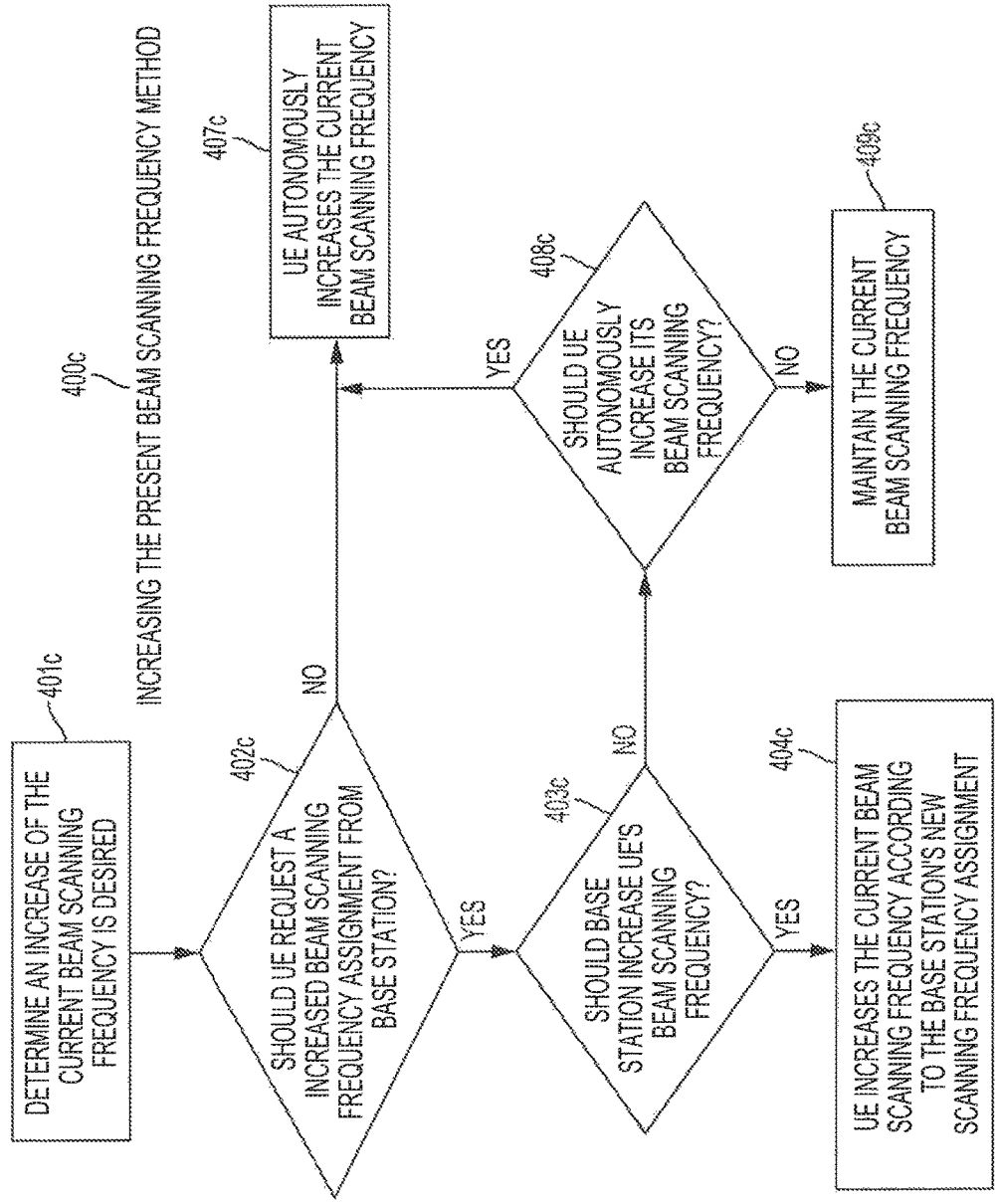
FIG. 4c is an example method of adjusting a beam scanning frequency according to some embodiments.

FIG. 4c illustrates an example method 400c, which increases the beam scanning frequency. Increasing a beam scanning frequency (e.g., reducing the periods between beam scans) may be called high mobility mode. Determination factors described above may be used in method 400c. In embodiments, there may be a plurality of tiers of high mobility mode, wherein the higher the mobility rate of change, the higher the high mobility mode tier. At step 401c, similar to step 405a, a controller processor 280 determines that a scan frequency increase is desired. In step 402c, controller processor 280 of UE 115 determines Whether to request an increased scanning frequency assignment from base station 105. If UE 115 decides to request an increased beam scanning frequency from base station 105, then transmit processor 264 of UE 115 may send a scanning frequency assignment increase request to receive processor 238 of base station 105. After receiving the request, in step 403b, control processor 240 of base station 105 determines whether to increase the current beam scanning frequency of UE 115. If controller processor 240 of base station 105 decides to increase the current beam scanning frequency assignment of UE 115, transmit processor 230 of base station 105 transmits a new beam scanning frequency assignment to receive processor 258 of UE 115. The transmitted new beam scanning frequency assignment is increased as compared to the current scanning frequency assignment. After receiving the new beam scanning frequency assignment, UE 115 adjusts its scanning frequency accordingly in step 404c. As is explained above, UE 115 may switch to the new beam scanning frequency assignment or reach the new beam scanning frequency assignment incrementally. Examples are above. Thereafter, future beam scans are performed according to the new scanning frequency assignment.

If at step 402c, UE 115 decides to increase its current beam scanning frequency without requesting a new scanning frequency assignment from base station 105, then UE moves to step 407b. In step 407c, UE 115 autonomously increases its current beam scanning frequency. As is explained above, UE 115 may switch to the new beam scanning frequency or reach the new beam scanning frequency incrementally. UE 115 may or may not inform base station 105 of the frequency increase. Thereafter, method 400a may be repeated as desired (e.g., periodically, upon a detected change in condition, and/or the like).

If at step 403c, base station 105 decides to deny the scanning frequency assignment increase request of UE 115, then at step 408b, UE 115 determines whether to adjust the beam scanning frequency autonomously. If UE 115 acquiesces to base station's 105 denial, then UE's beam scanning frequency is maintained (e.g., remains the same), step 409c. Thereafter, method 400a may be repeated as desired (e.g., periodically, upon a detected change in condition, and/or the like).

If UE 115 decides to increase its beam scanning frequency despite base station's 105 denial, then method 400c moves to step 407c. In step 407c, UE 115 autonomously increases the current beam scanning frequency. As is explained above, UE 115 may switch to the new beam scanning frequency or reach the new beam scanning frequency incrementally. Examples are above. UE 115 may or may not inform base station 105 of the increase. Thereafter, method 400a may be repeated as desired (e.g., periodically, upon a detected change in condition, and/or the like).

Figure 5:
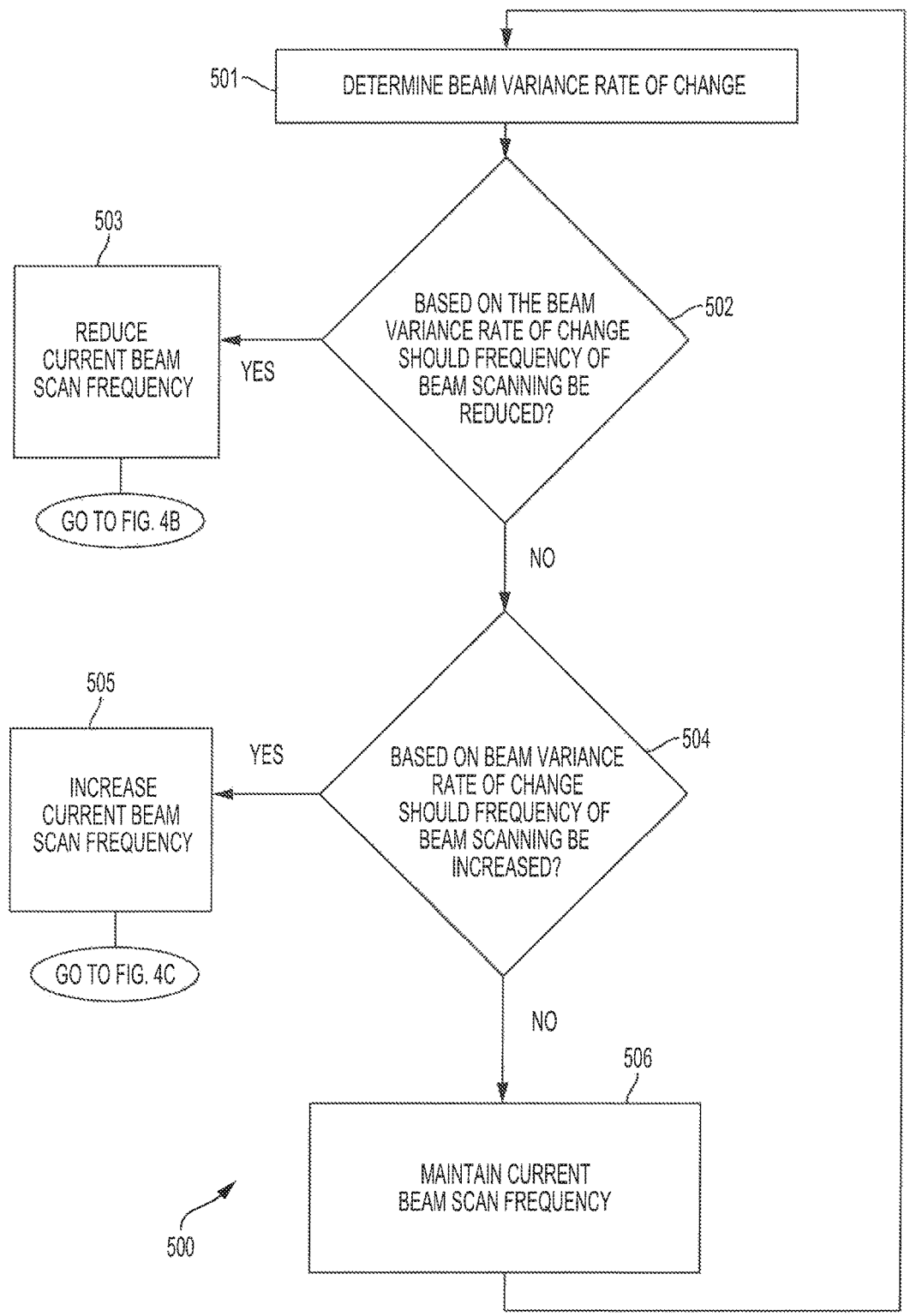
FIG. 5 is an example method of adjusting a beam scanning frequency according to some embodiments.

FIG. 5 illustrates an example method 500 wherein the rate of change is based on beam variance (e.g., changes in the beams over x number of beam scans). In step 501, a processor determines a beam variance rate of change. In embodiments, controller processor 280 of UE 115 determines an amount of beam changes that occurred during x beam sweeps. If desired, each counted beam change may be weighted by a factor representing a significance of the beam change, wherein a beam selection is compared to its adjacent beam selection. In step 502, based on the determined beam variance rate of change, controller processor 280 of UE 115 decides whether reducing the current beam scanning frequency is desired. For example, if controller processor 280 of UE 115 determines that the beam variance rate of change is above a beam variance threshold range, then method 500 moves to step 503, wherein the controller processor 280 reduces the current beam scanning frequency. Examples of reducing are above.

If in step 502, controller processor 280 of UE 115 decides the current beam scanning frequency should not be reduced, method 500 moves to step 504. In step 504, based on the determined beam variance rate of change, controller processor 280 of UE 115 decides whether the current beam scanning frequency should be increased. For example, if controller processor 280 of UE 115 determines that the beam variance rate of change is below a beam variance threshold range, then method 500 moves to step 505, wherein the controller processor 280 increases the current beam scanning frequency. Examples of beam scanning frequency increases are described above. If in step 504 controller processor 280 of UE 115 determines that the beam variance rate of change is within a beam variance threshold range, then method 500 moves to step 506, wherein the current beam scanning frequency maintained (e.g., not increased or decreased). Thereafter, method 500 may be repeated as desired (e.g., periodically, upon a detected change in condition, and/or the like).

In some embodiment, UE 115 may determine that the beam variance is above a refined beam variance threshold range despite having already reduced its beam scanning frequency. In such a case, UE 115 may inform base station 105 that it is already in a high mobility mode or the highest mobility mode (e.g., short period between beam scanning such as 5 ms, 1 ms, etc.). UE 115 may also send a request to base station 105 requesting beam refinement via a CSI-RS (channel state information reference signal). If base station 105 determines that a beam refinement is warranted, base station 105 sends a UE 115 beam refinement information, which UE 115 uses to refine its beam.

Of course, UE 115 may combine methods 400a and 500 such that beam scanning frequencies are adjusted based on a combination of mobility and beam variances. Further, UE 115 may adjust its beam scanning frequency based on historical and/or statistical information of beam changes overtime corresponding to mobility tracking over time.

Further still, different scanning frequencies may be adopted by different antenna arrays 202a-202n within a single UE 115. For instance, UE 115 having a plurality of antenna arrays 202a-202n, one or more of the antenna arrays may perform beam scanning at a different frequency as compared to one or more of the other antenna arrays. For example, 202a may perform beam scanning at the same or different frequency as compared to 202b as compared to 202c as compared to 202n. UE 115 may simultaneously adopt two, three, four, or more different beam scanning frequencies according to any of the methods described above as is desired.

In embodiments, UE 115 may use an orientation change to trigger a proactive determination regarding whether to adjust the scanning frequency of one or more antenna subarray 203*a*-203*n*. For example, after performing one of the methods described above, UE 115 may determine that reduction of the scanning frequency of antenna subarray 302*a* is desired. In embodiments, UE 115 then reduces the scanning frequency of antenna subarray 302*a*. Thereafter, if gyro 205 detects that the orientation of UE 115 has changed (e.g., rotated 90 degrees from landscape to portfolio), UE 115 may proactively determine whether adjusting the scanning frequency of antenna subarray 302*a* is desirable. In order to act proactively, UE 115 may adjust the beam scanning frequency of antenna subarray 302*a* prior to one of the threshold ranges described above being breached. Likewise, UE 115 may use this technique to independently and proactively adjust the scanning frequency of the other antenna subarrays 202*n*-202*n*.

In embodiments, UE 115 may use methods described above to adjust the various antenna subarrays' scanning frequencies. Additionally or alternatively, UE 115 may rely on historical data and/or statistical data when adjusting the antenna subarrays. For example, if in the recent past (e.g., 100 ms, 2 seconds, 10 seconds, and/or the like) this new portfolio orientation of the UE 115 benefited from known scanning frequencies, then UE 115 may restore those known beneficial scanning frequencies to the respective antenna arrays. For instance, while UE 115 is in a landscape orientation, antenna subarray 302*a* is operating at a 5 ms scanning frequency and antenna subarray 302*b* is operating at a lower beam scanning frequency (e.g., 10 ms). Then, when UE 115 is flipped to profile orientation, gyro 205 detects the rotation. Controller processor 280 may determine or have previously determined that such an orientation change lends to antenna subarray 302*a* operating effectively at a low beam scanning frequency (e.g., 20 ms) and antenna subarray 302*b* operating effectively at a comparatively higher beam scanning frequency (e.g., 5 ms). In this example, controller processor 280 may proactively change the scanning frequencies of the various antenna arrays before a mobility threshold range, beam variance threshold range, and/or refined beam variance threshold range is breached.

The foregoing concepts are applicable with respect to a number of communication system and network element configurations. For example, the exemplary implementations discussed may be utilized with respect to network elements having single input single output (SISO), single input multiple output (SIMO), multiple input single output (MISO), and/or multiple input multiple output (MIMO) configurations. With MIMO beamforming, uplink-downlink mixed interference is likely to have less impact due in part because transmit beamforming allows the transmitter to control the directionality of its signal, receiver nulling allows the receiver to emphasize its desired signal over the interference, and/or 3D antenna array configuration allows further interference rejection due to elevation angular separation. Nevertheless, the use of jamming graph for a MIMO configuration is similar to that of a SISO configuration. A few refinements to be considered with respect to a MIMO configuration, however, include the beamforming direction may be selected keeping mixed interference in mind to reduce jamming impact (e.g., the beam selection may be performed in a way that maximizes the signal to leakage ratio), the IoT resulting from the best beam direction should be compared with the tolerable IoT to determine the power back-off, and the IoT computation should take into account the MIMO beamforming, receiver nulling and elevation angular separation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the figures may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A wireless communication method that selectively adjusts a beam scanning periodicity for wireless transmission comprising:
    performing radio frequency (RF) communications beam scanning for wireless transmission at an assigned periodicity;
    determining a beam variance rate of change based on a number of beam changes made over a number of beam sweeps; and
    based at least on the determined beam variance rate of change, adjusting a periodicity at which the beam scanning is performed.

2. The method of claim 1 wherein the adjusting comprises:
    based at least on the determined rate of change, deciding to adjust the periodicity at which the beam scanning is performed; and
    based at least on the decision to adjust the periodicity, changing the periodicity at which the beam scanning is performed.

3. The method of claim 1 wherein the adjusting comprises:
    performing beam scanning at a lesser periodicity as compared to an assigned periodicity by skipping one or more scheduled scannings of the assigned periodicity.

4. The method of claim 3 further comprising:
    returning the performing of the beam scanning to the assigned periodicity.

5. The method of claim 1 wherein the adjusting comprises:
    performing beam scanning at a lesser periodicity as compared to an assigned periodicity by changing the assigned periodicity to the lesser periodicity.

6. The method of claim 5 further comprising:
    returning the performing of the beam scanning to the assigned periodicity.

7. The method of claim 1 further comprising:
    comparing the determined beam variance rate of change to a beam variance threshold range, wherein the adjusting is based at least on the comparing.

8. The method of claim 7, wherein, in response to detecting that an orientation sensed by a gyroscope has changed, the adjusting occurs prior to the beam variance threshold range being breached.

9. A non-transitory computer-readable medium having program code recorded thereon, which causes user equipment to selectively adjust a beam scanning periodicity for wireless transmission, the program code comprising:
    code for performing radio frequency (RF) communications beam scanning for wireless transmission at an assigned periodicity;
    code for determining a beam variance rate of change based on a number of beam changes made over a number of beam sweeps; and
    based at least on the determined beam variance rate of change, code for adjusting a periodicity at which the beam scanning is performed.

10. The non-transitory computer-readable medium of claim 9 wherein the adjusting comprises:
    based at least on the determined rate of change, code for deciding to adjust a periodicity at which the beam scanning is performed; and
    based at least on the decision to adjust the periodicity, code for changing the periodicity at which the beam scanning is performed.

11. The non-transitory computer-readable medium of claim 9 wherein the adjusting comprises:
    code for performing beam scanning less periodicity as compared to an assigned periodicity by skipping one or more scheduled scanning of the assigned periodicity.

12. The non-transitory computer-readable medium of claim 11 further comprising:
    code for returning the performing of the beam scanning to the assigned periodicity.

13. The non-transitory computer-readable medium of claim 9 wherein the adjusting comprises:
    code for performing beam scanning at a lesser periodicity as compared to an assigned periodicity by changing the assigned periodicity to the lesser periodicity.

14. The non-transitory computer-readable medium of claim 13 further comprising:
    code for returning the performing of the beam scanning to the assigned periodicity.

15. The non-transitory computer-readable medium of claim 9 further comprising:
    code for comparing the determined beam variance rate of change to a beam variance threshold range, wherein the adjusting is based at least on the comparing.

16. The non-transitory computer-readable medium of claim 15, wherein, in response to detecting that an orientation sensed by a gyroscope has changed, the adjusting occurs prior to the beam variance threshold range being breached.

17. A wireless communication user equipment (UE) that selectively adjusts a beam scanning periodicity for wireless transmission comprising:
   a control processor that performs radio frequency (RF) communications beam scanning for wireless transmission at an assigned periodicity; and
   a sensor that determines a beam variance rate of change of the UE based on a number of beam changes made over a number of beam sweeps,
   wherein based at least on the determined beam variance rate of change, the control processor adjusts a periodicity at which the beam scanning is performed.

18. The UE of claim 17 wherein the control processor adjusts the periodicity at which the beam scanning is performed comprises the control processor skips one or more scheduled performance of the assigned periodicity.

19. The UE of claim 18 wherein the control processor returns the periodicity at which the beam scanning is performed to the assigned periodicity.

20. The UE of claim 17 wherein the control processor adjusts the periodicity at which the beam scanning is performed comprises the control processor increasing a period between beam scans as compared to the assigned periodicity.

21. The UE of claim 20 wherein the control processor returns the periodicity at which the beam scanning is performed to the assigned periodicity.

22. The UE of claim 17 wherein the control processor compares the determined beam variance rate of change to a beam variance threshold range, wherein the adjustment is based at least on the comparison.

23. The UE of claim 17, wherein the sensor is a gyroscope.

24. The UE of claim 23, wherein, in response to detecting that an orientation sensed by the gyroscope has changed, the adjusting occurs prior to the beam variance threshold range being breached.

25. A wireless communication user equipment (UE) that selectively adjusts a beam scanning periodicity for wireless transmission comprising:
   a control processor that performs radio frequency (RF) communications beam scanning at an assigned periodicity; and
   a sensor that determines a mobility rate of change of the UE,
   wherein based at least on the determined mobility rate of change, the control processor adjusts a periodicity at which the beam scanning is performed, wherein the adjustment comprises:
   comparing the determined mobility rate of change to a mobility threshold range; and
   performing one of:
      reducing the periodicity at which the beam scanning is performed based at least on a mobility rate of change being below the mobility threshold range;
      increasing the periodicity at which the beam scanning is performed based at least on the mobility rate of change being above the mobility threshold range; and
      maintaining the periodicity at which the beam scanning is performed based at least on the mobility rate of change being within the mobility threshold range.

26. The UE of claim 25, wherein the adjustment comprises the performing reducing the frequency at which the beam scanning is performed based at least on a mobility rate of change being below a mobility threshold range.

27. The UE of claim 25, wherein the adjustment comprises the performing increasing the frequency at which the beam scanning is performed based at least on the mobility rate of change being above the mobility threshold range.

28. The UE of claim 25, wherein the adjustment comprises the performing maintaining the frequency at which the beam scanning is performed based at least on the mobility rate of change being within the mobility threshold range.

29. The UE of claim 25, wherein the sensor is a gyroscope.

30. The UE of claim 29, wherein, in response to detecting that an orientation sensed by the gyroscope has changed, the adjusting occurs prior to the mobility threshold range being breached.

* * * * *